United States Patent [19]

Clark

[11] Patent Number: 4,875,894
[45] Date of Patent: Oct. 24, 1989

[54] CONTINUOUSLY VARIABLE TRANSMISSION

[76] Inventor: Paul L. Clark, 3315 Marble Ter., Colorado Springs, Colo. 80906

[21] Appl. No.: 241,268

[22] Filed: Sep. 7, 1988

[51] Int. Cl.⁴ .............................................. F16H 55/52
[52] U.S. Cl. ........................................ 474/49; 474/56
[58] Field of Search ................. 474/47, 49, 50, 52–57, 474/69, 70

[56] References Cited

U.S. PATENT DOCUMENTS

| | | | |
|---|---|---|---|
| 593,895 | 11/1897 | Jasper | 474/56 X |
| 652,092 | 6/1900 | Desprez et al. | 474/56 |
| 672,962 | 4/1901 | Seymour | 474/56 X |
| 3,722,305 | 3/1973 | Walters et al. | 74/125.5 |
| 3,750,485 | 8/1973 | Blakemore | 74/125.5 |
| 3,956,944 | 5/1976 | Tompkins | 474/54 X |
| 4,326,431 | 4/1982 | Stephenson | 74/63 |
| 4,475,412 | 10/1984 | Evans | 74/119 |

OTHER PUBLICATIONS

David Scott, "At Last: Mass-Production Stepless Transmission", *Popular Science*, Mar. 1984, pp. 48–50.

Dan McCosh, "Finally–CVT", *Popular Science*, Sep. 1987, pp. 56–59.

*Primary Examiner*—Thuy M. Bui
*Attorney, Agent, or Firm*—Linda Flewellen Gould

[57] ABSTRACT

A transmission is described which provides a continuously and infinitely variable number of ratios within a finite range of gear ratios. The transmission comprises two rotary disk assemblies, one of which is driven by an input shaft, and the other of which drives an output shaft to which varying loads may be applied. The two disk assemblies are connected by a coupling mechanism, such as a coupling ring, which rotates in response to the rotation of the input disk assembly, causing the output disk assembly to rotate in the same direction. The coupling ring rides on contact pads located within slots in each of the disk assemblies, which contact pads form two circles with continuously variable diameters with respect to the center of each disk assembly. The contact pads move along slots of differing angles on two disks within each disk assembly at a position determined by the intersection of the angled slots.

26 Claims, 4 Drawing Sheets

CONTINUOUSLY VARIABLE TRANSMISSION

BACKGROUND OF THE INVENTION

1. Technical Field

This invention pertains to a transmission which provides continuously variable gear ratios. Within a finite range, the transmission will automatically provide the optimum gear ratio to match the driving force to the load. The transmission is suitable for general use, in applications including automobiles, bicycles, and various machines.

2. Background Art

Standard vehicle and machine transmissions are restricted to a finite number of gear ratios. Recognizing the efficiency that would result from a continuously variable, or "stepless", transmission, a number of designs have been attempted. U.S. Pat. No. 3,722,305 to Walters et al. describes a drive mechanism particularly designed for a marine winch. A rotary cam having a plurality of lobes engages a plurality of cam followers as the cam is rotated. The cam followers, in turn, engage separate levers which are connected to over-running clutches.

Similarly, a variable mechanical transmission is described in U.S. Pat. No. 3,750,485 to Blakemore. A continuous mechanical drive is effected by means of a plurality of one-way clutches connected in tandem between a rotary output member and a plurality of variable excursion mechanical oscillators shifted in phase in relation to each other and driven by a rotary input member.

U.S. Pat. No. 4,475,412 to Evans presents a transmission wherein arm driven gear plates alternately engage and drive an output shaft. The gear components of this device are in positive engagement with one another, avoiding the drawbacks of pliable or belt power transmission components.

Although the devices described in the Walters, Blakemore, and Evans patents may constitute functioning continuously variable transmissions, these transmissions share certain disadvantages. The complexity of each of these prior designs and the large number of moving parts restricts them to low speed applications. In short, these transmissions are not practical for automobiles or other fast moving vehicles or machines.

The transmission device described in U.S. Pat. No. 4,326,431 to Stephenson is comprised of a drive wheel and a driven wheel which are positioned adjacent and parallel to each other. Movement imparting bars of the drive wheel engage movement receiving pegs of the driven wheel. A range of gear ratios is obtained by varying the relative position of the two wheels. The Stephenson transmission provides a variable number of gear ratios within the limits of 1:1 and 2:1. In order for the movement imparting bars to mesh with the movement receiving pegs the distance between the two elements must be exact multiples of each other. This would only occur in a limited number of ratios; other ratios would necessitate a series of jumps in the speed of one of the wheels as they rotate, perhaps resulting in rough operation and stress on the component parts.

Automobile manufacturers have long realized the efficiency and advantages of a continuously variable transmission, and have attempted to achieve such a transmission through devices other than the patented transmissions described above. Thus, several automobile manufacturers appear to have focused on the transmission design described in Popular Science articles of March, 1984 (Page 48), and September, 1987, (Page 56). This transmission relies on a belt running on movable cone pulleys. Although numerous types of belts have been attempted, none seems to have a sufficient life to be practical, or sufficient strength to be used with heavy loads. Furthermore, hydraulic or electronic controls are needed to set the pulley ratios and control a clutch. The power required to run the hydraulic system also reduces efficiency. While continuously variable transmissions are known in the prior art, all of the existing continuously variable transmissions share the limitation of either not being suitable to heavy loads, such as in vehicles other than compact cars or not capable of handling high speed applications.

DISCLOSURE OF THE INVENTION

SUMMARY OF THE INVENTION

An object of this invention is to provide a continuously variable transmission which is suitable for high speed and heavy load applications, while having high efficiency.

Another object of this invention is to provide a continuously variable transmission which automatically selects the optimum gear ratio, and is capable of changing gear ratios while operating under load.

Another object of this invention is to provide such a transmission by means of a simple and economical construction design, which will not be subject to rapid deterioration of parts or other limitations on the life of the transmission.

The continuously variable transmission of this invention comprises an input rotary assembly, an output rotary assembly, and a coupling means to provide mechanical coupling from the input rotary assembly to the output rotary assembly. The coupling means may comprise a coupling ring, which is rigid, such as a ring constructed of steel or other non-elastic material, or pliable, such as a reinforced fiber belt.

The input rotary assembly may surround an input shaft, which is rotatable by application of an input force. The input rotary assembly is connected to the input shaft in such a manner that the input rotary assembly is caused to rotate by the rotation of the input shaft. The output rotary assembly is connected to an output shaft in such a manner that the output shaft is caused to rotate by the rotation of the output rotary assembly.

The effective diameters of the input rotary assembly and of the output rotary assembly are variable, and will increase and decrease inversely with respect to each other. Such variable diameter rotary assemblies can be accomplished in a number of ways.

The input rotary assembly may comprise an input power disk, an input positioning disk, and a plurality of input contact pads positioned adjacent to either the input power disk, the input positioning disk, or adjacent to both. The input power disk is connected to the input shaft, so that the input power disk rotates as the input shaft rotates. The input power disk may advantageously contain a plurality of input power disk slots uniformly spaced in a generally radial configuration, each of which has a common angle of curvature with respect to the center of the input power disk.

The input positioning disk may surround the input shaft, but is not connected directly to it. The input positioning disk is parallel to the input power disk, and contains a plurality of input positioning disk slots equal in number to the input power disk slots. Although each input positioning disk slot has a common angle of curvature with respect to the center of the input positioning disk, this angle of curvature is different from the common angle of curvature of each input power disk slot.

A plurality of input contact pads are each positioned adjacent to an input power disk slot, at a point of intersection with an input positioning disk slot. A guiding means is utilized to cause each input contact pad to travel along the corresponding input power disk slot, and along the corresponding input positioning disk slot, so that the input contact pads are positioned at a continuously variable and equal distance from the center of the power disk and the center of the positioning disk. As the input power disk is rotated, the input contact pads are urged outward, along the input power disk slots. Each input contact pad is held adjacent to the input power disk in a manner that restricts the input contact pad from rotating or moving in any direction other than radially from center as determined by the intersecting point of the input power disk slot and the input positioning disk slot.

The output rotary assembly may be advantageously constructed in a similar manner to the input rotary assembly. Alternatively, either or both of these assemblies may be constructed with dual power disks and dual positioning disks. For example, the output rotary assembly may comprise two output power disks, two output positioning disks, and a plurality of output contact pads positioned between the two output power disks and between the two output positioning disks. Each of the output power disks may surround and is connected to the output shaft, so that the rotation of the output power disks causes the output shaft to rotate. Each output power disk contains a plurality of output power disk slots uniformly spaced in a generally radial configuration, with each slot having a common angle of curvature with respect to the center of the applicable output power disk.

In an assembly with dual positioning disks, the two output positioning disks may surround the output shaft, parallel to the output power disks, but are not connected directly to the output shaft. Each output positioning disk contains a plurality of output positioning disk slots, equal in number to the output power disk slots in each output power disk, and having a common angle of curvature with respect to the center of each output positioning disk, which angle of curvature is different from the common angle of curvature of each output power disk slot.

As is the case for the rotary assembly having a single power disk and a single positioning disk, the contact pads traverse a path defined by the intersection of the power disk slots and the positioning disk slots. In this manner, the contact pads comprise chords of a circle, which circle has a continuously variable diameter.

The coupling ring encompasses the input rotary assembly and the output rotary assembly, resting adjacent to one or more contact pads of each assembly. Thus, the distance between the coupling ring and the center of the input rotary assembly varies inversely with the distance between the coupling ring and the center of the output rotary assembly.

The distance between the coupling ring resting on the input contact pads and the center of the input rotary assembly is dependent on the driving torque applied to the input shaft and the load applied to the output shaft. As the force applied to the input shaft is increased, the rotation of the input power disk urges the input contact pads outward, with a force proportional to the applied force, along the path defined by the intersection of the input power disk slots and the input positioning disk slots. This point of intersection changes in response to the magnitude of the rotational force of the input shaft, while the input positioning disk is rotated relative to the input power disk by the radial force of the input contact pads.

The input power disk slots are advantageously curved so that a rotational force applied to the input power disk automatically pushes the input contact pads traveling along the input power disk slots toward and tightly against the coupling ring. As a result, the contact pads are urged toward the coupling ring with increasing force as the rotational force is increased, and the coupling ring is not permitted to slip as the contact pads rotate, but is pushed in the same orbit as the input contact pads.

As the input contact pads are forced outward in response to the rotational torque of the input shaft, the distance between the coupling ring and the center of the input power disk or disks is increased. However, the output rotary assembly provides an opposing set of forces which, together with the constant circumference of the coupling ring, provides a limitation on the increasing diameter of the input rotary assembly.

The load under which the output shaft is placed results in a force restricting the rotation of the output power disk or disks. As the input rotary assembly is rotated, and the input contact pads forced outward, the coupling ring applies a force to the output contact pads in the direction of rotation of the coupling ring. This force tends to rotate the output contact pads, and thus to rotate the output power disk and the output shaft to which it is attached. The load applied to the output shaft provides a force opposing this rotational force, as well as causing the output contact pads to exert an outward force on the coupling ring proportional to this rotational force.

In this manner, the gear ratio between the input rotary assembly and the output rotary assembly is varied, over an infinitely variable spectrum within the limits of the length of the input power disk slots and output power disk slots. The transmission automatically selects the optimum gear ratio for the existing input force and output load. This continuously variable transmission is provided in a simple and economical manner, and in a manner that does not cause any part of the transmission to be excessively deteriorated. Furthermore, the components of the transmission are in positive no-slip engagement with each other, which eliminates slippage common in other friction drive transmissions. Additional advantages of this invention will become apparent from the description which follows, taken in conjunction with the accompanying drawings.

DETAILED DESCRIPTION OF THE PREFERRED EMBODIMENT

Figure 1:
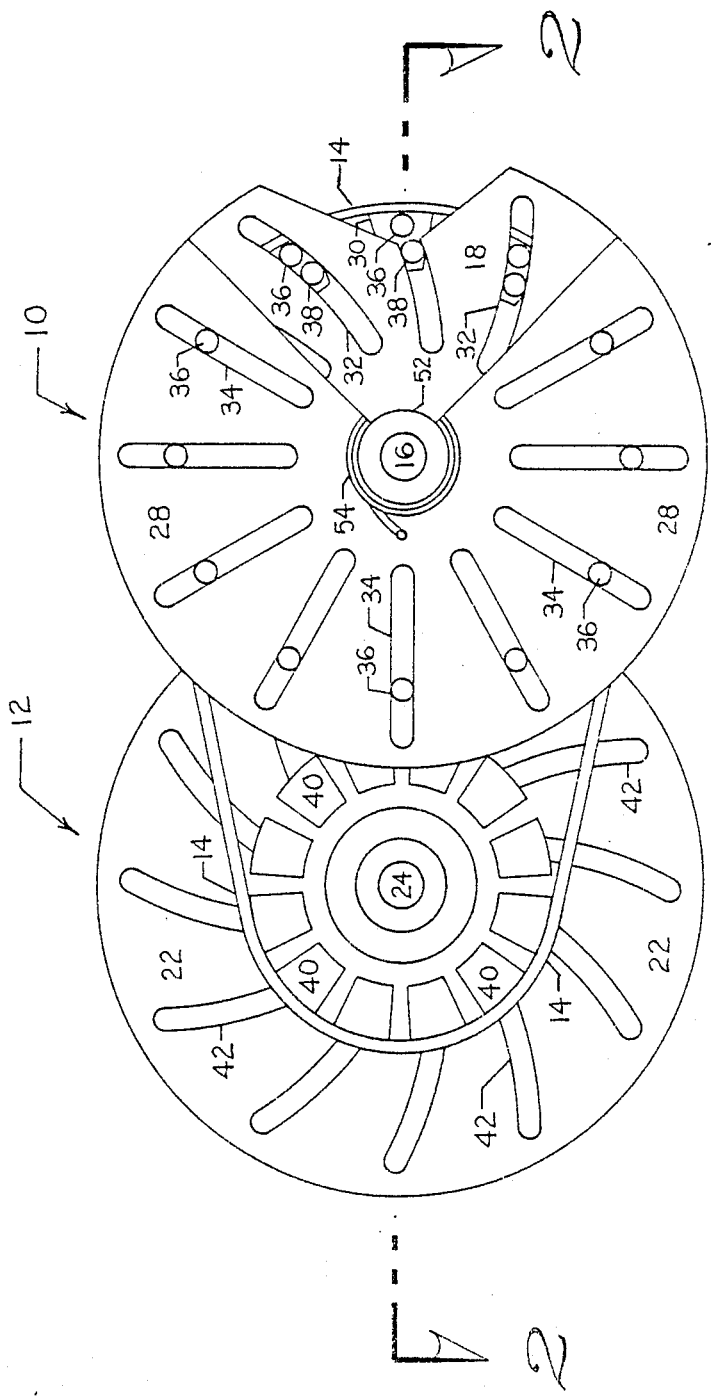
FIG. 1 a front elevational view of a continuously variable transmission, constructed according to a preferred embodiment of the invention described herein, wherein a portion of an input power disk has been cut away to reveal an input positioning disk, and a portion of the input positioning disk has been cut away to reveal a pad and coupling ring.
Figure 3:
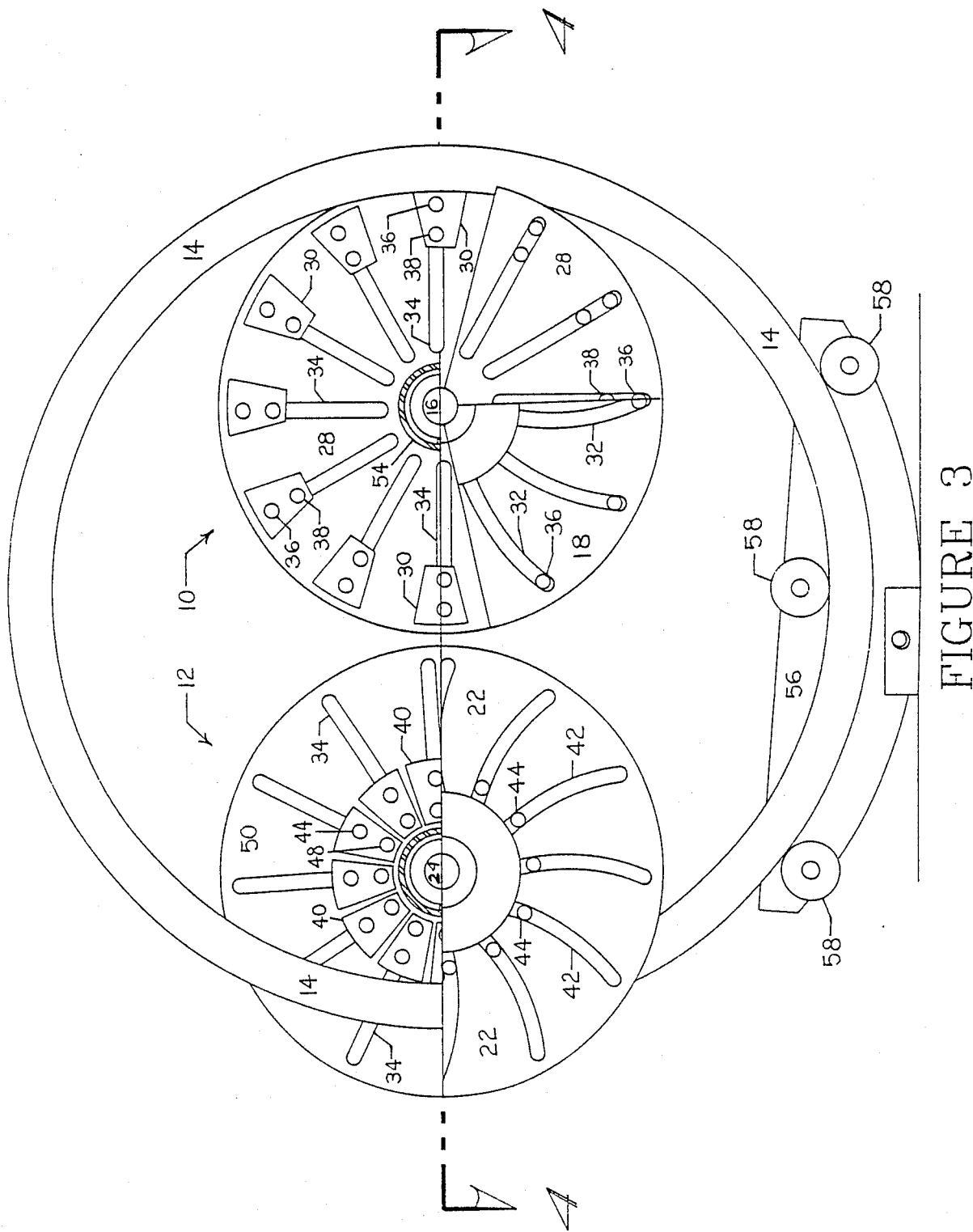
FIG. 3 is a front elevational view of the continuously variable transmission of this invention, illustrating a preferred embodiment in which each rotary assembly comprises dual power disks and dual positioning disks, wherein a portion of an input power disk and an input positioning disk have been cut away to reveal a plurality of contact pads and a second input positioning disk, and wherein a portion of an output power disk has been cut away to reveal an output positioning disk, and a portion of that output positioning disk has been cut away to reveal a plurality of contact pads and a second output positioning disk.

The features of the continuously variable transmission according to the present invention can be better understood by reference to FIG. 1. As is shown in FIG. 1, the transmission comprises an input rotary assembly 10, an output rotary assembly 12, and a coupling means 14 to provide mechanical coupling from the input rotary assembly 10 to the output rotary assembly 12. The coupling means 14 may comprise a pliable belt, such as shown in FIG. 1, a rigid ring, as shown in FIG. 3, or some other mechanical coupling apparatus.

Figure 2:
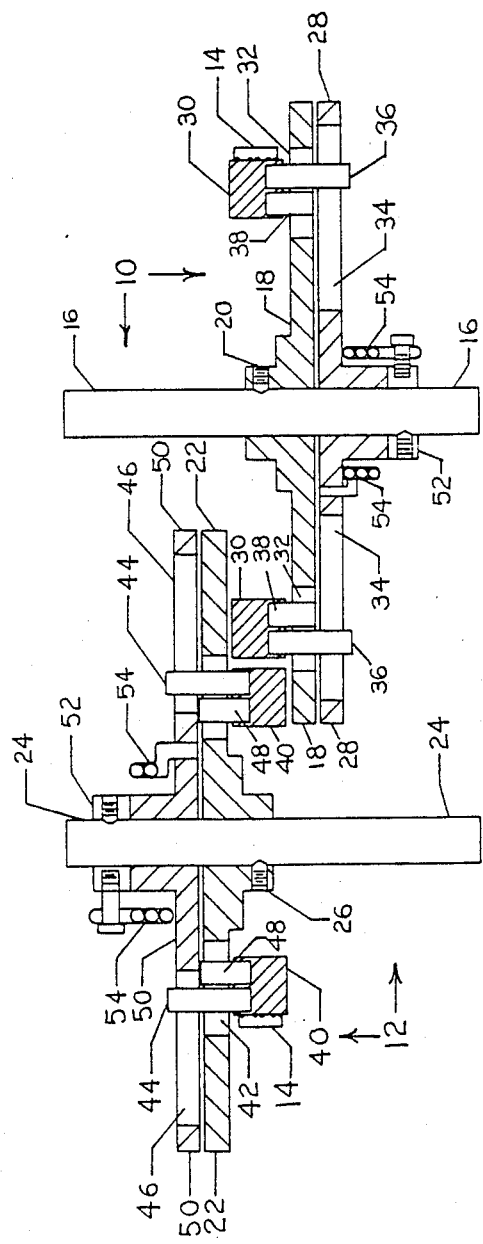
FIG. 2 is a horizontal sectional view of the continuously variable transmission of this invention, taken generally along line 2—2 FIG. 1 in the direction of the arrows.

The input rotary assembly 10 is responsive to an input force applied to an input shaft 16. In the embodiment shown in FIG. 1 and FIG. 2, this is accomplished by connecting an input power disk 18 to the input shaft 16, by a connection means 20 as shown in FIG. 2. In this manner, the input power disk 18 is caused to rotate by the rotation of the input shaft 16. Similarly, as shown in FIG. 2, an output power disk 22 is connected to an output shaft 24 by a connecting means 26, so that the output shaft 24 is caused to rotate by rotation of the output power disk 22.

The input rotary assembly 10 shown in FIG. 1 comprises the input power disk 18, an input positioning disk 28, and a plurality of input contact pads 30 positioned adjacent to the input power disk 18. The input power disk 18 contains a plurality of input power disk slots 32, uniformly spaced in a generally radial configuration, each of which has a common angle of curvature with respect to the center of the input power disk 18.

The input positioning disk 28 shown in FIG. 1 surrounds the input shaft 16, and is parallel to the input power disk 18. The input positioning disk 28 contains a plurality of input positioning disk slots 34 equal in number to the input power disk slots 32. Each of the input positioning disk slots 34 has a common angle of curvature with respect to the center of the input positioning disk 28, which angle of curvature is different from the angle of the power disk slots 32 and may be zero degrees as shown by the straight slots in FIG. 1.

The input contact pads 30 are each positioned adjacent to an input power disk slot 32, at a point of intersection with an input positioning disk slot 34. In this manner, the input contact pads 30 are each located an equal distance from the center of the input rotary assembly 10. A guiding means, such as a first bearing pin 36 as shown in FIG. 1 and FIG. 2, extends from each input contact pad 30 through a corresponding input power disk slot 32 and through a corresponding input positioning disk slot 34. A second bearing pin 38 extends from each input contact pad 30 through the corresponding input power disk slot 32, to maintain a constant and correct orientation of the input contact pad 30 along the path of the input power disk slot 32.

As can be seen by reference to FIG. 1, the coupling means 14 rests upon the input contact pads 30, and is thus held at a continuously variable distance from the center of the input rotary assembly 10. A spring mechanism 54 may be advantageously used to provide a force urging each positioning disk 28, 50 to rotate relative to the power disks 18, 22 in an opposite direction of rotation, so as to push the contact pads 30, 40 outward, against the coupling means 14. In this manner, the contact pads 30, 40 are held tightly against the coupling means 14.

Rotation of the input shaft 16 by an input torque causes rotation of the input power disk 18 and the attached input contact pads 30. As a result of the curvature of the input power disk slots 32 in the direction opposite the direction of rotation of the input power disk 18, the input contact pads 30 apply an input force comprising two components, an input tangential force, and an input radial force which is proportional to the input tangential force. The input radial force urges the input contact pads 30 outward along the path of the input power disk slots 32 where they are held tightly against the coupling means 14, to avoid slippage. The input tangential force causes rotation of the coupling means 14.

The output rotary assembly 12 shown in FIG. 1 and FIG. 2, is analogous to the input rotary assembly 10. A plurality of output contact pads 40 are held at an equal and continuously variable distance from the center of the output rotary assembly 12, along a path defined by a plurality of output power disk slots 42. A third bearing pin 44, as shown in FIG. 2, extends from each output contact pad 40, through a corresponding output power disk slot 42 and through a corresponding output positioning disk slot 46. A fourth bearing pin 48 extends from each output contact pad 40 through the corresponding output power disk slot 42, to maintain a constant and correct orientation of the output contact pad 40 along the path of the output power disk slot 42.

The output positioning disk 50 (not shown in FIG. 1) surrounds the output shaft 24, and is parallel to the output power disk 22. The output positioning disk 50 contains a plurality of output positioning disk slots 46 equal in number to the output power disk slots 42. As shown in FIG. 2, each positioning disk 28, 50 may be held in place on the corresponding shaft 16, 24 by a collar 52 which prevents the positioning disk from moving laterally on the corresponding shaft 16, 24, but does not connect the positioning disk 28, 50 to the corresponding shaft.

As the input rotary assembly 10 is rotated, and the input contact pads 30 are rotated and forced outward, the coupling means 14 applies the input tangential force to the output contact pads 40 in the direction of rotation of the coupling means 14. Thus, the input tangential force tends to rotate the output contact pads 40, and thus to rotate the output power disk 22 and the output shaft 24 to which the output power disk 22 is attached. A load applied to the output shaft 24 opposes this rotation. The coupling means 14, as a result of the input radial force, urges the output contact pads 40 inward, toward the center of the output rotary assembly 12.

As a result of the load applied to the output shaft 24, the output contact pads 40 produce an output force proportional to the load. This output force comprises two components, an output tangential force, and an output radial force which is proportional to the output tangential force. The output radial force, resulting from the direction of curvature of the output power disk slots 42, holds the output contact pads 40 tightly against the coupling means 14, to avoid slippage. Additionally, the output radial force tends to move the coupling means 14 in the direction opposite of the input radial force of the input rotary assembly 10.

If the input radial force applied to the output rotary assembly 12 by the coupling means 14 is greater than the output radial force of the output rotary assembly 12, the axis of the coupling means 14 will move in a direction which increases the distance between the input contact pads 30 and the center of the input rotary assembly 10 and decreases the distance between the output contact pads 40 and the center of the output rotary assembly 12. This movement will increase the gear ratio, thereby decreasing the input radial force while increasing the output radial force. The axis of the coupling means 14 will continue to move in this direction until the output radial force equals the input radial force. Since the input radial force and the output radial force are of equal proportion to the input tangential force and output tangential force respectively, this balance occurs when these tangential forces are equal.

Because the output rotary assembly 12 is a driven member, the output tangential force cannot be greater than the input tangential force, but must be equal to or less than the input tangential force. A bias may be applied to the coupling means 14 causing it to respond as if the output radial force is larger than the input radial force when they are actually equal. This bias may be accomplished by having a stronger spring mechanism 54 in the output rotary assembly 12 than in the input rotary assembly 10. The output radial force combined with the bias can be larger than the input radial force, in which case the coupling means 14 will respond to decrease the gear ratio until a balance of radial forces is obtained. Thus the coupling means 14 will adjust the radii of the input rotary assembly 10 and the output rotary assembly 12 to select the optimum gear ratio for the load and the drive torque available. In this manner, the gear ratio between the input rotary assembly 10 and the output rotary assembly 12 is varied, over an infinitely variable spectrum within the limits of the length of the input power disk slots 32 and the output power disk slots 42.

Figure 4:
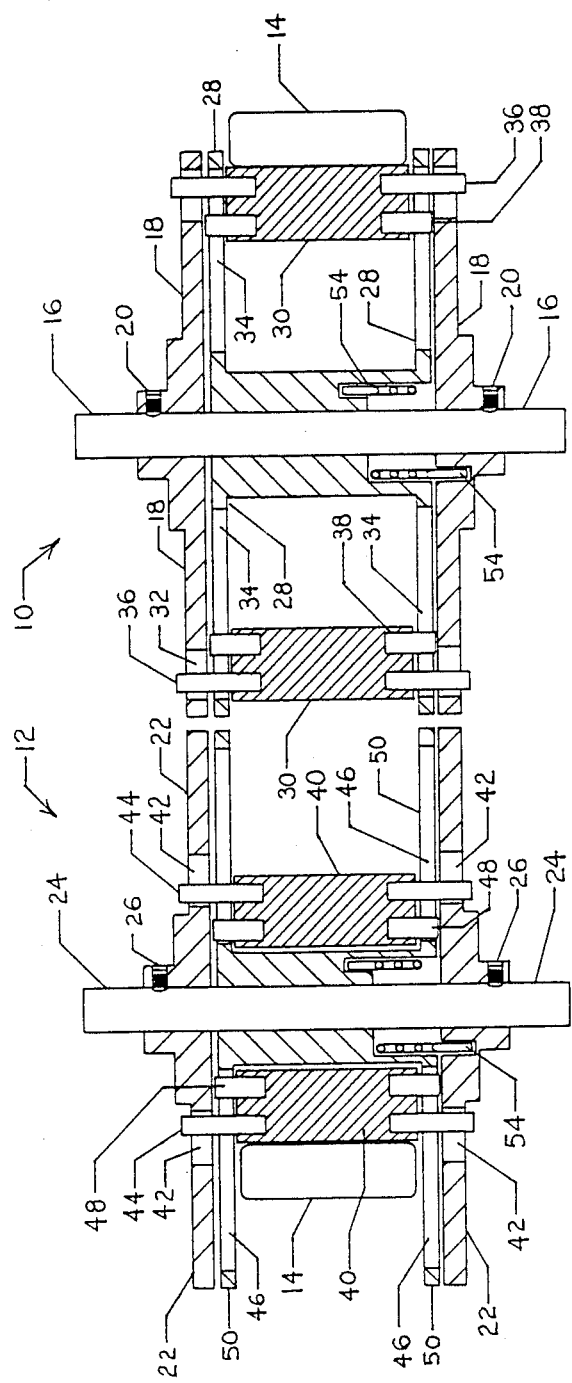
FIG. 4 is a horizontal sectional view of the continuously variable transmission of this invention, taken generally along line 4—4 of FIG. 3 in the direction of the arrows.

FIG. 3 and FIG. 4 illustrate another preferred embodiment of the continuously variable transmission of this invention. In this embodiment, dual power disks 18, 22 and dual positioning disks 28, 50 are utilized in both the input rotary assembly 10 and the output rotary assembly 12.

As can be seen by reference to FIG. 4, two input power disks 18 are connected to the input shaft 16. Both of the input power disks 18 are caused to rotate by the rotation of the input shaft 16. Similarly, as shown in FIG. 4, two output power disks 22 are connected to the output shaft 24, so that the output shaft 24 is caused to rotate by rotation of the output power disks 22.

The input rotary assembly 10 shown in FIG. 3 comprises two input power disks 18, two input positioning disks 28, and a plurality of input contact pads 30 positioned adjacent to and between the input positioning disks 28. The input power disks 18 contain a plurality of input power disk slots 32, uniformly spaced in a generally radial configuration, each of which has a common angle of curvature with respect to the center of the applicable input power disk 18.

The input positioning disks 28 shown in FIG. 4 surround the input shaft 16, and are parallel to the input power disks 18. The input positioning disks 28 contain a plurality of input positioning disk slots 34 equal in number to the input power disk slots 32. Each of the input positioning disk slots 34 has a common angle of curvature with respect to the center of the applicable input positioning disk 28, which angle of curvature is different from the angle of the power disk slots 32 and may be straight as shown in FIG. 3.

The input contact pads 30 are each positioned adjacent to an input positioning disk slot 34 on each of the input positioning disks 28, at a point of intersection with corresponding input power disk slots 32. In this manner, the input contact pads 30 rotary assembly 10. A guiding means, such as dual first bearing pins 36 as shown in FIG. 3 and FIG. 4, extend in opposite directions from each input contact pad 30 through corresponding input positioning disk slots 34 and through corresponding input power disk slots 32. A set of second bearing pins 38 extends in opposite directions from each input contact pad 30 through corresponding input positioning disk slots 34, to maintain a constant and correct orientation of the input contact pad 30 along the path of the input positioning disk slots 34.

As can be seen by reference to FIG. 3, the coupling means 14 rests upon the input contact pads 30, and is thus held at a continuously variable distance from the center of the input rotary assembly 10. The input power disks 18 are caused to rotate by an input torque applied to the input shaft 16. Because of the direction of curvature of the input power disk slots 32, the input contact pads 30 cause an input tangential force, and an input radial force. The input contact pads 30 are held tightly against the coupling means 14 by the input radial force.

The output rotary assembly 12 shown in FIG. 3 and FIG. 4, is analogous to the dual power disks version of the input rotary assembly 10. A plurality of output contact pads 40 are held at an equal and continuously variable distance from the center of the output rotary assembly 12, along a path defined by a plurality of output power disk slots 42. As shown in FIG. 4, two output positioning disks 50 surround the output shaft 24, and are parallel to the output power disks 22. Each output positioning disk 50 contains a plurality of output positioning disk slots 46 equal in number to the output power disk slots 42 on the corresponding output power disk 22.

A set of third bearing pins 44, as shown in FIG. 4, extend in opposite directions from each output contact pad 40, through corresponding output positioning disk slots 46 and through corresponding output power disk slots 42. A set of fourth bearing pins 48 extend in opposite directions from each output contact pad 40 through the corresponding output positioning disk slots 46.

As the input rotary assembly 10 is rotated, and the input contact pads 30 forced outward and rotated, the coupling means 14 applies the input radial force and the input tangential force to the output contact pads 40. The input tangential force tends to rotate the output contact pads 40, and thus to rotate the output power disks 22 and the output shaft 24 to which the output power disks 22 are attached. A load applied to the output shaft 24 opposes the input rotational force, causing the output contact pads 40 to exert an output radial force on the coupling means 14.

As in the single power disk transmission illustrated in FIG. 1 and FIG. 2, the distance between the input contact pads 30 and the center of the input rotary assembly 10 of FIG. 3 and FIG. 4 varies inversely with the distance between the output contact pads 40 and the center of the output rotary assembly 12. In this manner, the gear ratio between the input rotary assembly 10 and the output rotary assembly 12 is varied, over an infinitely variable spectrum within the limits of the length of the input power disk slots 32 and the output power disk slots 42.

As can be seen by reference to FIG. 3, the coupling means 14 may be advantageously held in a particular position or path by a coupling guide 56. To avoid friction and a resulting loss of efficiency, the coupling ring 14 may rotate on bearings 58 within the coupling guide 56.

The invention has been described in detail with particular reference to preferred embodiments thereof. As will be apparent to those skilled in the art in the light of the accompanying disclosure, many alterations, substitutions, modifications, and variations are possible in the practice of the invention without departing from the spirit and scope of the invention.

I claim:

1. A continuously variable transmission comprising:
   a. An input shaft rotatable by application of an input torque,
   b. An input rotary assembly of variable diameter, comprising a plurality of input contact pads arranged in a circular configuration and in a common plane, which input contact pads may expand outward or move inward to vary the diameter of the input rotary assembly, connected to the input shaft so that the input contact pads are urged outward to increase the diameter of the input rotary assembly by the input torque applied to the input shaft, and so that the input contact pads are caused to rotate by rotation of the input shaft,
   c. An output rotary assembly of variable diameter, comprising a plurality of output contact pads arranged in a circular configuration and in a common plane, which output contact pads may expand outward or move inward to vary the diameter of the output rotary assembly,
   d. An output shaft to which a load is applied, connected to the output rotary assembly so that the output shaft is caused to rotate by rotation of the output rotary assembly, and
   e. Coupling means to provide mechanical coupling from the input rotary assembly to the output rotary assembly, wherein said coupling means comprises a coupling ring encircling the input rotary assembly and the output rotary assembly, contacting the input rotary assembly so that the coupling ring is caused to rotate as the input contact pads rotate, and contacting the output rotary assembly so that the output rotary assembly is caused to rotate as the coupling ring rotates, which coupling ring couples the input torque and the load.

2. A continuously variable transmission as described in claim 1, wherein said input rotary assembly further comprises: two input power disks, each connected to the input shaft, so that each input power disk is caused to rotate as the input shaft rotates, each input power disk effecting a radial curvilinear path of travel of the input contact pads with a specific angle of curvature in a direction which provides a radial force of a magnitude to position the coupling ring at a location which will match the input torque to the load.

3. A continuously variable transmission as described in claim 1, wherein said output rotary assembly further comprises: two output power disks, each connected to the output shaft, so that the output shaft is caused to rotate as each output power disk rotates, each output power disk effecting a curvilinear path of travel of the output contact pads with a specific angle of curvature in a direction which provides a radial force of a magnitude to position the coupling ring at a location which will match the input torque to the load.

4. A continuously variable transmission comprising:
   An input shaft rotatable by application of an input torque,
   An input rotary assembly of variable diameter, which transforms the input torque into an input tangential force and an input radial force proportionate to the input tangential force, comprising a plurality of input contact pads arranged in a circular configuration and in a common plane, which input contact pads may expand outward or move inward to vary the diameter of the input rotary assembly, which input rotary assembly is connected to the input shaft so that the input contact pads are urged outward to increase the diameter of the input rotary assembly by the input radial force, and so that the input contact pads are caused to rotate by the input tangential force,
   An output rotary assembly of variable diameter, comprising a plurality of output contact pads arranged in a circular configuration and in a common plane, which output contact pads may expand outward or move inward to vary the diameter of the output rotary assembly,
   An output shaft to which a load is applied, connected to the output rotary assembly so that the output shaft is caused to rotate by rotation of the output rotary assembly and so that the output rotary assembly transforms the load into an output tangential force and an output radial force proportionate to the output tangential force, so that the output contact pads are urged outward by the output radial force, and
   Coupling means to provide mechanical coupling from the input rotary assembly to the output rotary assembly, which coupling means causes the diameter of the input rotary assembly to vary inversely to the diameter of the output rotary assembly, which coupling means has an axis which shifts in response to an imbalance between the input radial force and the output radial force until a balance is attained, to establish a gear ratio that matches the input torque to the load.

5. A continuously variable transmission as described in claim 4, wherein said input rotary assembly further comprises: an input power disk connected to the input shaft, so that the input power disk is caused to rotate as the input shaft rotates, containing a plurality of input power disk slots uniformly spaced in a curved radial configuration, each input power disk slot having a common angle of curvature with respect to the center of the input power disk, so that each input contact pad is supported by and may move along a path defined by the angle and length of a corresponding input power disk slot.

6. A continuously variable transmission as described in claim 5, wherein said input rotary assembly further comprises: an input positioning disk, parallel to the input power disk, containing a plurality of input positioning disk slots equal in number to the input power disk slots, each input positioning disk slot having a common angle of curvature with respect to the center of the input positioning disk, which angle of curvature is different from the common angle of curvature of each input power disk slot, so that there is a common distance between the center of the input rotary assembly and an input point of intersection along each input power disk slot at which that input power disk slot intersects a corresponding input positioning disk slot.

7. A continuously variable transmission as described in claim 6, wherein said input rotary assembly further comprises: guiding means causing each input contact pad to travel along a corresponding input power disk slot, and along a corresponding input positioning disk slot, so that the input contact pads are positioned at the input point of intersection which is a continuously variable distance from the center of the input rotary assembly.

8. A continuously variable transmission as described in claim 7, wherein said guiding means comprises a plurality of first bearing pins, each first bearing pin extending from an input contact pad, through a corresponding input power disk slot, and through a corresponding input positioning disk slot, so that each input contact pad is positioned along the input power disk slot through which the applicable first bearing pin extends at the input point of intersection.

9. A continuously variable transmission as described in claim 6, wherein a spring mechanism rotates the input positioning disk relative to the input power disk so as to urge the input contact pads outward.

10. A continuously variable transmission as described in claim 4, wherein said output rotary assembly further comprises: an output power disk connected to the output shaft, so that the output shaft is caused to rotate as the output power disk rotates, containing a plurality of output power disk slots uniformly spaced in a curved radial configuration, each output power disk slot having a common angle of curvature with respect to the center of the output power disk, so that each output contact pad is supported by and may move along a path defined by the angle and length of a corresponding output power disk slot.

11. A continuously variable transmssion as described in claim 10, wherein said output rotary assembly further comprises: an output positioning disk parallel to the output power disk, containing a plurality of output positioning disk slots equal in number to the output power disk slots, each output positioning disk slot having a common angle of curvature with respect to the center of the output positioning disk, which angle of curvature is different from the common angle of curvature of each output power disk slot, so that there is a common distance between the center of the output rotary assembly and an output point of intersection along each output power disk slot at which that output power disk slot intersects a corresponding output positioning disk slot.

12. A continuously variable transmission as described in claim 11, wherein said output rotary assembly further comprises: guiding means causing each output contact pad to travel along a corresponding output power disk slot, and along a corresponding output positioning disk slot, so that the output contact pads are positioned at the output point of intersection which is a continuously variable distance from the center of the output rotary assembly.

13. A continuously variable transmission as described in claim 12, wherein said guiding means comprises a plurality of third bearing pins, each third bearing pin extending from an output contact pad, through a corresponding output power disk slot, and through a corresponding output positioning disk slot, so that each output contact pad is positioned along the output power disk slot through which the applicable third bearing pin extends at the output point of intersection.

14. A continuously variable transmission as described in claim 10, wherein a spring mechanism rotates the output positioning disk relative to the output power disk so as to urge the output contact pads outward.

15. A continuously variable transmission as described in claim 4, wherein said input rotary assembly further comprises: two input power disks, each connected to the input shaft, so that each input power disk is caused to rotate as the input shaft rotates, each input power disk containing a plurality of input power disk slots uniformly spaced in a curved radial configuration, each input power disk slot having a common angle of curvature with respect to the center of each input power disk, so that each input contact pad is supported by and may move along a path defined by the angle and length of a corresponding input power disk slot in each input power disk.

16. A continuously variable transmission as described in claim 15, wherein said input rotary assembly further comprises: two input positioning disks, each parallel to the input power disks, each input positioning disk containing a plurality of input positioning disk slots equal in number to the input power disk slots in each input power disk, each input positioning disk slot having a common angle of curvature with respect to the center of each input positioning disk, which angle of curvature is different from the common angle of curvature of each input power disk slot, so that there is a common distance between the center of the input rotary assembly and an input point of intersection along each input power disk slot at which that input power disk slot intersects a corresponding input positioning disk slot.

17. A continuously variable transmission as described in claim 14, wherein said input rotary assembly further comprises: guiding means causing each input contact pad to travel along a corresponding input power disk slot of each input power disk, and along a corresponding input positioning disk slot of each input positioning disk, so that the input contact pads are positioned between the input power disks and between the input positioning disks at the input point of intersection.

18. A continuously variable transmission as described in claim 17, wherein said guiding means comprises a plurality of first bearing pins, each first bearing pin extending from an input contact pad, through a corresponding input power disk slot in each of the two input power disks, and through a corresponding input positioning disk slot in each of the two input positioning disks, so that each input contact pad is positioned along and between the input power disk slots through which the applicable input pin extends at the input point of intersection.

19. A continuously variable transmission as described in claim 16, wherein a spring mechanism rotates the input positioning disks relative to the input power disks so as to urge the input contact pads outward.

20. A continuously variable transmission as described in claim 4, wherein said output rotary assembly further comprises: two output power disks, each connected to the output shaft, so that the output shaft is caused to rotate as each output power disk rotates, each output power disk containing a plurality of output power disk slots uniformly spaced in a curved radial configuration, each output power disk slot having a common angle of curvature with respect to the center of each output power disk, so that each output contact pad is supported by and may move along a path defined by the angle and length of corresponding output power disk slots.

21. A continuously variable transmission as described in claim 20, wherein said output rotary assembly further comprises: two output positioning disks, each parallel to the output power disks, each output positioning disk containing a plurality of output positioning disk slots equal in number to the output power disk slots in each output power disk, each output positioning disk slot having a common angle of curvature with respect to the center of each output positioning disk, which angle of curvature is different from the common angle of curvature of each output power disk slot, so that there is a common distance between the center of the output rotary assembly and an output point of intersection along each output power disk slot at which that output power disk slot intersects a corresponding output positioning disk slot.

22. A continuously variable transmission as described in claim 21, wherein said output rotary assembly further comprises: guiding means causing each output contact pad to travel along a corresponding output power disk slot of each output power disk, and along a corresponding output positioning disk slot of each output positioning disk, so that the output contact pads are positioned at the output point of intersection.

23. A continuously variable transmission as described in claim 22, wherein said guiding means comprises a plurality of third bearing pins, each third bearing pin extending from an output contact pad, through a corresponding output power disk slot in each of the two output power disks, and through a corresponding output positioning disk slot in each of the two output positioning disks, so that each output contact pad is positioned along the output power disk slots through which the applicable output pin extends at the output point of intersection.

24. A continuously variable transmission as described in claim 4, wherein said coupling means is held in a designated path by a coupling guide.

25. A continuously variable transmission as described in claim 24, wherein said coupling guide comprises a stationary guide through which the coupling means may rotate.

26. A continuously variable transmission as described in claim 25, wherein said coupling guide further comprises a set of bearings, adjacent to which the coupling means may rotate.

* * * * *